(No Model.) 2 Sheets—Sheet 1.

J. W. GIBBONEY.
APPARATUS FOR MAINTAINING CONSTANT SPEED IN MOTOR MECHANISMS.

No. 474,008. Patented May 3, 1892.

WITNESSES—
Alex F. Macdonald
S. B. Thompson

INVENTOR—
John W. Gibboney.

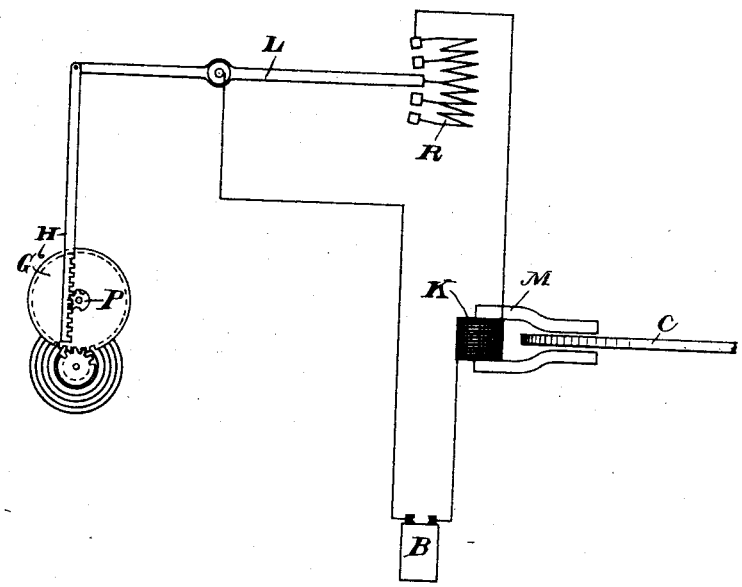

United States Patent Office.

JOHN W. GIBBONEY, OF LYNN, MASSACHUSETTS.

APPARATUS FOR MAINTAINING CONSTANT SPEED IN MOTOR MECHANISMS.

SPECIFICATION forming part of Letters Patent No. 474,008, dated May 3, 1892.

Application filed September 25, 1890. Serial No. 366,057. (No model.)

*To all whom it may concern:*

Be it known that I, JOHN W. GIBBONEY, a citizen of the United States, and a resident of Lynn, county of Essex, and Commonwealth of Massachusetts, have invented an Improvement in Methods of and Apparatus for Maintaining Uniform Speed in Motor Mechanisms, of which the following is a specification.

My invention is a novel method of and apparatus for controlling the speed of motor mechanisms, such as chronometers and other mechanisms; and it consists in providing such mechanisms with an electric retarding device and in varying the energy consumed in said retarding device or controlling its breaking effect in correspondence with the impelling or driving power required to operate the driven mechanism, whereby the speed of said mechanism is maintained constant and uniform, whether the power tending to move the same be constant or variable.

My invention also consists in certain arrangements for regulating the amount of the retardation effected by the electro-magnetic device, as will hereinafter be described.

The object of my invention is to secure a speed-governing appliance which is simple and cheap to construct, which makes little or no noise in its operation, which is susceptible of great delicacy of regulation, in which the relation of the various parts is quite stable when once established, and one in which an automatic adjustment may readily be made for temperature or other modifying effects which would change the rate of motion and which have to be compensated for, and the means for accomplishing such regulation.

My invention is particularly applicable to chronometers wherein as uniform a motion as it is possible to obtain is required, and in the following specification I will describe its application to such mechanism, inasmuch as this use of it will exemplify its applicability to all mechanisms requiring great certainty and perfection of speed regulation. I wish it to be understood, therefore, that my invention can be used with other motor mechanisms in which it is desired to maintain a uniform motion or rate of movement, notwithstanding the driving-power may be constant or variable in amount, and I do not limit myself at all to its application to chronometers, but claim such a retarding device applied to any mechanism for obtaining a uniform rate of movement.

Figure 1:
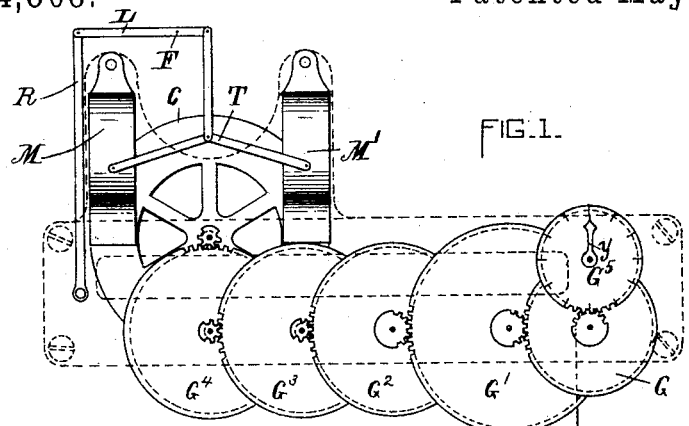
Figure 2:
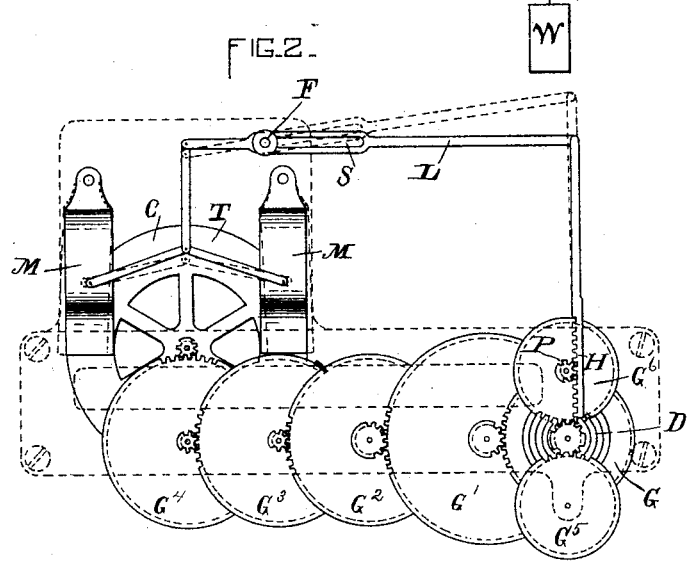
Figure 4:
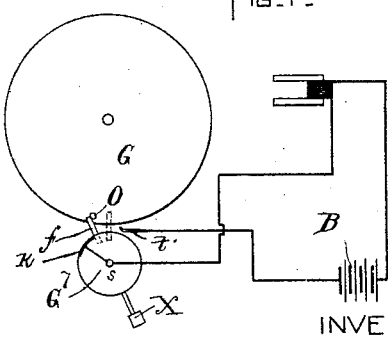

Figure 1 is a diagrammatic view illustrating the invention applied to a mechanism where the driving force is constant, or approximately so. Fig. 2 illustrates, diagrammatically, that form of my invention applied to mechanisms in which the motive power is not constant, but varies, and shows means for compensating for such variation. Fig. 3 illustrates a modified way of regulating the retarding effect of the electric generator. Fig. 4 shows means for preserving constant the strength of the magnetism in a permanent magnet as used in my invention.

In Fig. 1, G is a toothed wheel adapted to be rotated by a constant force—such as a weight W—and gearing into other wheels G' $G^2$ $G^3$ $G^4$, as shown, to obtain a relatively high rate of rotation in a conductor (in this instance a copper disk may be used) revolving in the magnetic field of one or more permanent magnets M M'. The descent of the weight W revolves the disk C, of copper or other conducting metal, (and which might also be a coil of wire on closed circuit,) in the magnetic field of the magnets M M', developing in it electric currents, through whose action a retardation or regulation of the descent of the weight W is obtained in such manner that a uniform rate of revolution is imparted to the wheels G G' $G^2$ $G^3$ $G^4$, respectively, whose movements may therefore be used to measure intervals of time or impart a uniform motion to or retard at a uniform rate other mechanism, and by properly proportioning the ratio of increase or decrease of the gearing indicate time on an ordinary clock-dial in the usual manner. Thus the connecting-wheel $G^5$ and others geared thereto might have an indicating-hand Y attached, arranged to traverse the face of a dial. It is manifest, however, that the wheel $G^5$, instead of being a wheel in a clock-train, may represent any connected device geared to the system and which it is desired to operate at a uniform rate of speed by the weight W, this weight representing any suitable source of power, constant or variable.

To compensate for the difference in rate which would be caused by changes of temperature I provide an expansible rod R or other expansible medium suitably connected and arranged with reference to the electric generator, so that the retarding effect is so varied in correspondence with temperature changes that the speed is kept constant. One of the ways of accomplishing this is illustrated in the figure, where a toggle T and lever L, fulcrumed at the point F, move the magnets M M' laterally from their position of embracing the disk C to a position where they are less effective in producing a retardation when the speed would be diminished by a change of temperature and to a more effective position when the speed would be increased by a change of temperature.

An adjustment can be had by making the fulcrum F changeable or capable of being changed as to its position on the lever L, or by any equivalent means for regulating the effect of the thermo-responsive device upon the electric generator.

Instead of a constant impelling force such as is shown in Fig. 1, there is illustrated in Fig. 2 a spring-driven mechanism. In this instance the spring D decreases in power as it unwinds, and thus a constantly-decreasing rate of revolution would be given to the wheels G G', &c. To compensate for this change in the power supplied and to maintain the rate of revolution uniform as the impelling or driving power diminishes, I provide means which will place the magnetic field and the closed-circuit conductor in the most effective position for retardation at the start, or when the spring is fully wound up, and gradually remove them from this position to one of less effectiveness for retarding the motion as the spring D unwinds and becomes weaker and weaker. One way of accomplishing this is shown in the figure, where H is a rod provided with teeth which engage with a pinion on the same shaft with the wheel G. This rod operates a lever L and toggle T, as in Fig. 1, to move the magnets M M' laterally, or to a position where fewer lines of force are engaged as the spring unwinds. By making the lever L with a slot S in such manner that the fulcrum can be changed an adjustment is readily obtained for different strengths of springs at D.

In Fig. 3 I have shown that, instead of a permanent magnet, an electro-magnet may be employed, through whose coils flows a current from a source of constant potential, such as a battery B. The winding of this magnet is preferably made of very high resistance, so that an exceedingly small current can flow, when the circuit is completed, through the battery B, in order that the strength of the battery may be preserved through long periods of time. With this construction the retarding effect or breaking effect would be regulated by interposing more or less resistance in the circuit through the coils of the magnet and varying this resistance in accordance with the condition of the spring D as to tension, and also in accordance with the variations of power necessary to maintain the accessory mechanism above referred to at a uniform speed, and this would be the preferable arrangement where an electro-magnet is used. Thus in Fig. 3 the lever L, connected by the rod H to the pinion P of the wheel C, influenced by the unwinding-spring or varying source of power, may change the resistance R in the circuit L R B M to effect the requisite regulation.

While permanent magnets, if properly made and of suitable material, will retain their magnetism unaltered almost indefinitely, to guard against the possibility of their becoming weaker and changing the readings or the regulation of the mechanism I provide the arrangement shown in Fig. 4 for keeping them up to a constant strength. I accomplish this result by winding the permanent magnets in the same manner as an electro-magnet and periodically and automatically pass a magnetizing-current through the coil wound thereon from any suitable source for a very short time. Thus, as seen in Fig. 4, a small wheel $G^7$ is placed on a shaft $s$, and to it is attached a weight X, which tends to keep the pin $f$ in an upright position, as indicated by the dotted lines. Connections are made from a battery B to a contact-plate $t$, and from the other pole of the battery through the winding of the magnet to the shaft $s$ of the wheel $G^7$, and thence to a contact-plate $k$, carried on the wheel $G^7$. In the revolution of the wheel G the pin O engages with the pin $f$ of the wheel $G^7$ and rotates the latter to the position shown in the figure. When by further movement the pins O and $f$ become disengaged, the weight X acts as a pendulum and throws the contact $k$ for an instant in connection with the terminal $t$, when a current passes through the winding of the magnet, energizing it, and this connection may be made to occur as often as may be necessary to keep the magnetic strength of the magnet constant.

I wish it to be understood that the thermo-responsive device illustrated and described in connection with Fig. 1 can also be used with the modified arrangement shown in Fig. 2, and although I have not thought it necessary to show it in this figure, it is evident that such a regulator for temperature variations would be employed wherever needed, whether the magnets, one or more, were otherwise movable or not. It is of course evident that the magnets could be made the moving part and the copper disk stationary, or both of these might be moved in opposite directions; but neither would be so desirable an arrangement as that shown and described.

What I claim is—

1. The method of maintaining a constant speed in a motor mechanism, consisting in loading it with an electric generator and changing the relative position of the field-magnet and the moving conductor of said electric generator, whereby the counter-torque or breaking effect produced is suitably proportioned to changes in the driving-power.

2. The herein-described method of maintaining a uniform speed in a mechanical movement, consisting in loading the same with an electric generator and displacing the field-magnet and armature portions of said generator relatively to each other, whereby any increase in the driving-power will be proportionately compensated for by an increased absorption of energy in the electric generator and any decrease in the driving-power will be proportionately compensated for by a decreased consumption of energy in the electric generator.

3. The combination, with a motor mechanism which it is desired to operate at a uniform rate of speed, of an electric generator driven thereby, and means for displacing the field-magnet and armature of said generator relatively to each other, whereby the counter-torque or breaking effect produced maintains a practically constant speed in said mechanism.

4. The combination, with a motor mechanism, of a source of variable power, an electric generator driven thereby, an auxiliary device also driven thereby, and means for automatically adjusting the position of the field-magnet and armature of said generator with respect to each other, whereby the breaking effect produced maintains a practically constant speed in said mechanism.

5. The combination, with a motor mechanism, of an electro-magnetic generator for retarding and regulating its rate of movement, and a thermo-responsive device for increasing or decreasing the amount of retardation effected by said electric generator in correspondence with changes of temperature.

6. In an electric regulator, the combination of an armature, a permanent field-magnet, a coil for magnetizing said magnet, a source of electric current, and an automatic circuit-closing device whereby current from said electric-current source is periodically passed through said coil to preserve constant the strength of the permanent magnet.

7. The combination, in a retarding or governing device consisting of a closed-circuit electric conductor, a permanent magnet, and mechanism for moving them relatively to each other, so as to generate electric currents in the closed conductor, of means for automatically establishing a flow of current through a coil wound upon said magnet, whereby constancy of its magnetic strength is maintained.

Signed at Lynn, Massachusetts, this 20th day of September, 1890.

JOHN W. GIBBONEY.

Witnesses:
JOHN T. BRODERICK,
DUGALD McKILLOP.